March 31, 1959     F. E. HAMMOND     2,879,804
REINFORCED EXPANSION JOINT

Filed April 18, 1957     3 Sheets-Sheet 1

INVENTOR:
FRANK E. HAMMOND
BY Robert Henderson
ATTORNEY

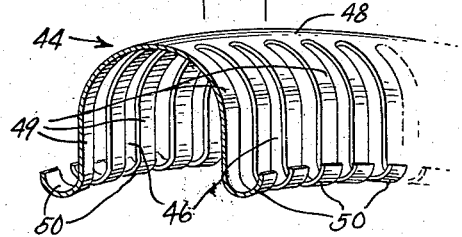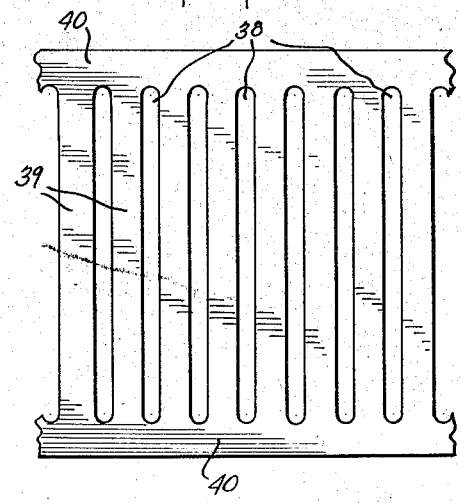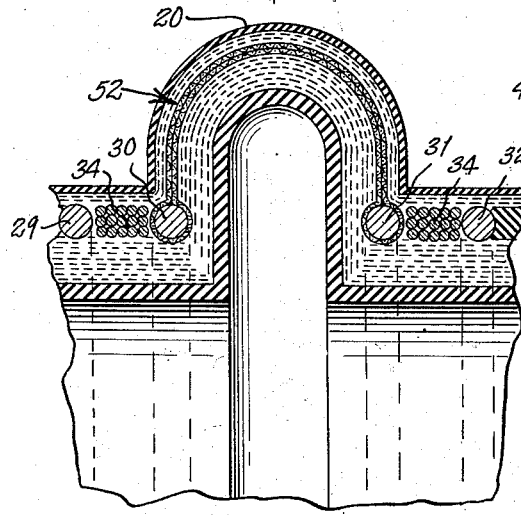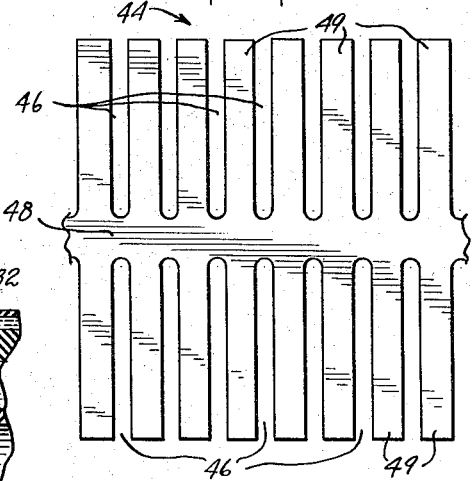

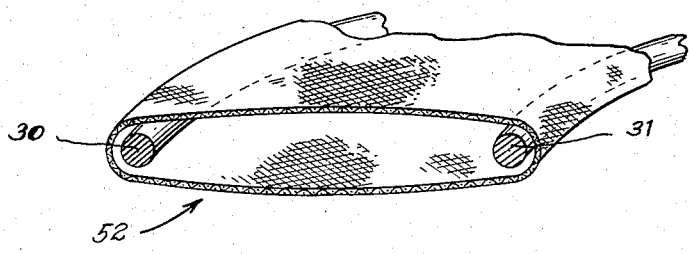
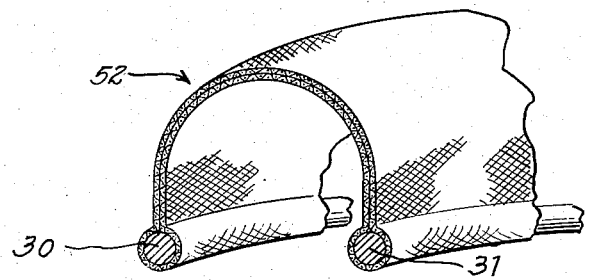
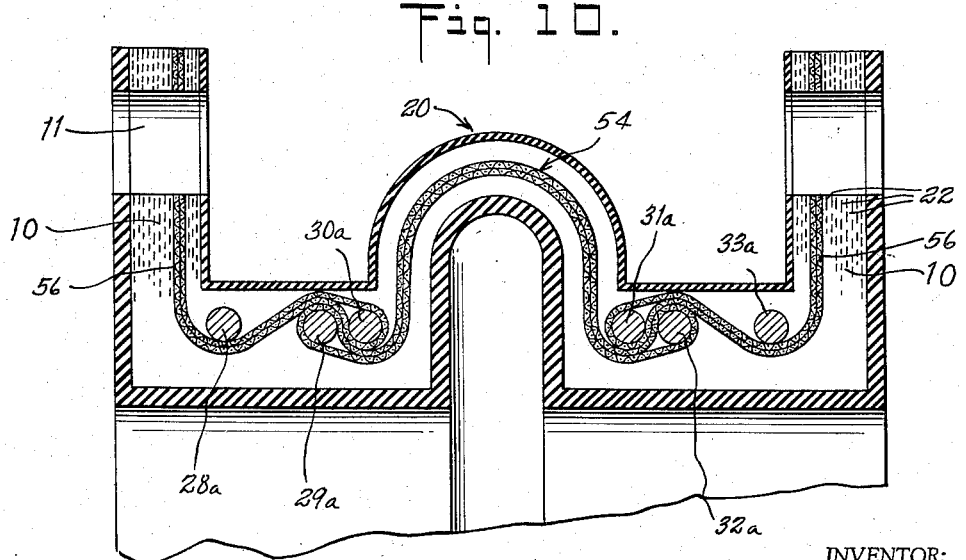

United States Patent Office 2,879,804
Patented Mar. 31, 1959

2,879,804

REINFORCED EXPANSION JOINT

Frank E. Hammond, Palmyra, N.Y., assignor to The Garlock Packing Company, Palmyra, N.Y., a corporation of New York Application April 18, 1957, Serial No. 653,700

7 Claims. (Cl. 138—56)

This invention relates to expansion joints such as are used in pipe lines to permit expansion and contraction of the latter in the presence of substantial temperature variations. It relates more particularly to such joints which include an annular arch which is flexible longitudinally of the joint to permit the joint to shorten and lengthen with such expansion and contraction.

An important object of this invention is the provision of such an expansion joint in which the annular arch is more effectively reinforced than in prior joints while the arch is left free to undergo its desired longitudinal flexing.

Another important object is the provision of such an improved arch-reinforced joint which includes reinforcing means for cylindrical and flanged end portions which interlock with the arch-reinforcing means to afford continuous, improved reinforcement substantially throughout the entire joint.

The foregoing and other more or less obvious objects are realized from the present invention of which several embodiments are shown, for illustrative purposes, in the accompanying drawings without, however, limiting the invention to those particular embodiments.

In the drawings:

Fig. 3 is a perspective fragmentary view of a preferred form of reinforcing element used in the embodiment of the invention illustrated in Figs. 1 and 2.

Fig. 4 is a fragmentary elevational view of a sheet metal blank such as may be formed into a reinforcing element of the character illustrated in Fig. 3.

Fig. 5 is a fragmentary perspective view somewhat similar to Fig. 3 but illustrating another form of reinforcing element which is usable within this invention.

Fig. 6 is a fragmentary elevational view of a sheet metal blank such as may be formed into a reinforcing element of the character illustrated in Fig. 5.

Fig. 7 is a fragmentary longitudinal-radial sectional view, somewhat similar in character to the central portion of Fig. 2, illustrating another embodiment of the present invention.

Fig. 8 is a fragmentary perspective view of certain members as associated in an early stage of the formation of a reinforcing element such as is employed in the embodiment of Fig. 7.

Fig. 9 is a fragmentary perspective view illustrating the final stage in the formation of the parts shown in Fig. 8 into a reinforcing element according to this invention.

Fig. 10 is a sectional view of the same general character as Fig. 2 but illustrating still another of various possible embodiments of this invention.

Figure 1:
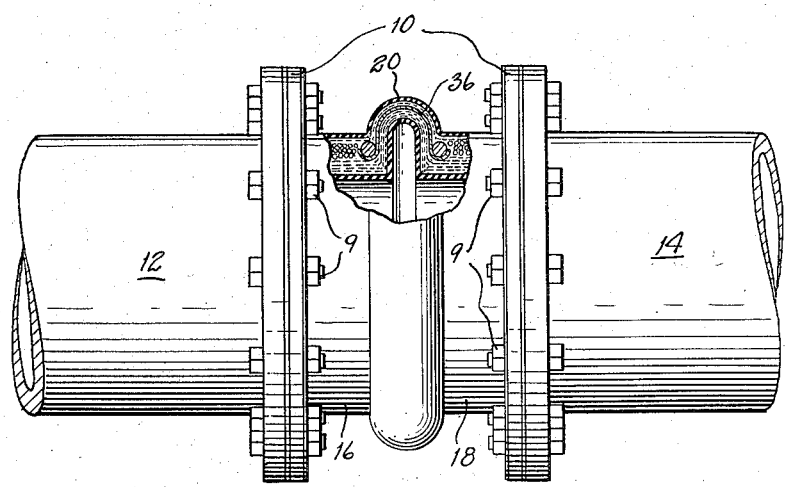
Figure 1 is an elevational view of an embodiment of this invention shown connected between end portions of pipe sections of a pipe line, certain portions of the joint being broken away to show internal parts.

Referring first to Figs. 1–4 inclusive, the improved expansion joint illustrated therein comprises, as its principal parts, annular end flanges 10 by means of which, with bolts 9 in bolt holes 11, the joint may be connected between pipe sections 12 and 14, cylindrical portions 16 and 18 adjoining the end flanges 10, and an annular arch 20 interconnecting the cylindrical portions 16 and 18 and constituting that part of the joint wherein is substantially localized the flexing which permits the joint to expand and contract.

It is important that the arch 20 be of such flexibility as to permit the joint as a whole to lengthen and shorten freely with the expansion and contraction of the pipe line within which the joint is installed, yet the arch must be strong enough to prevent material distention thereof and resultant bursting from the pressures carried within the pipe line and within the joint. The present invention is concerned primarily with providing reinforcement to give such strength to the arch 20 and secondarily with providing reinforcement in the joint as a whole.

Except for the novel features of the present invention, the expansion joint may be substantially similar to the joint illustrated and described in United States Patent No. 2,692,782, dated October 26, 1954, to which reference may be had for further details if necessary.

It should suffice for the present description to note that the joint consists primarily of plural layers or plies of relatively heavy woven fabric embedded within relatively soft, moulded rubber. The plies of fabric are identified by the reference character 22 and not only are the plies impregnated with rubber but rubber is disposed between the plies of fabric and also outside and inside of the joint, providing an outer layer or sheath 24 and an inner layer or sheath 26. In manufacture of the joint, suitable blank sheets of uncured rubber and suitable layers of impregnated fabric are wound about a generally cylindrical shaped mandrel form of mould which, with inner mould portions for supporting the arch 20 internally and with suitable outer mould portions, is employed for moulding the joint to its desired shape, the rubber, meanwhile, being cured. Other parts, elements, or members, hereinafter described, are assembled with the plies of fabric and with the rubber blanks before the moulding and curing of the joint.

Somewhat similarly to the joint disclosed in mentioned Patent No. 2,692,782, the present joint includes plural endless steel rings 28–33, inclusive, embedded in the two cylindrical portions 16 and 18 of the joint and windings 34 of wire disposed between steel rings 29 and 30 and steel rings 31 and 32. The mentioned steel rings 28–33, inclusive, are provided for affording very strong reinforcement to the cylindrical portions 16 and 18, and the windings 34 of wire are provided for the purpose of preventing rings 30 and 31 from shifting away from the arch of the joint when the latter is subjected to pressure, all as fully explained in the mentioned prior patent. As no wire windings need be provided between rings 28 and 29 and rings 32 and 33, and as no fabric is in position between the mentioned rings, the spaces between the mentioned rings would ordinarily be filled with rubber.

The reinforcing means which is provided according to this invention in the annular arch 20 may take the form of an annular reinforcing element 36 which in its final form is more or less semi-circular in shape cross-sectionally, or, i.e., as viewed along a longitudinal section of the joint. The arch 20 is approximately semi-circular or U-shaped, as viewed in such a longitudinal sectional view of the joint, and the reinforcing element 36 is completely embedded within said arch 20.

Figure 2:
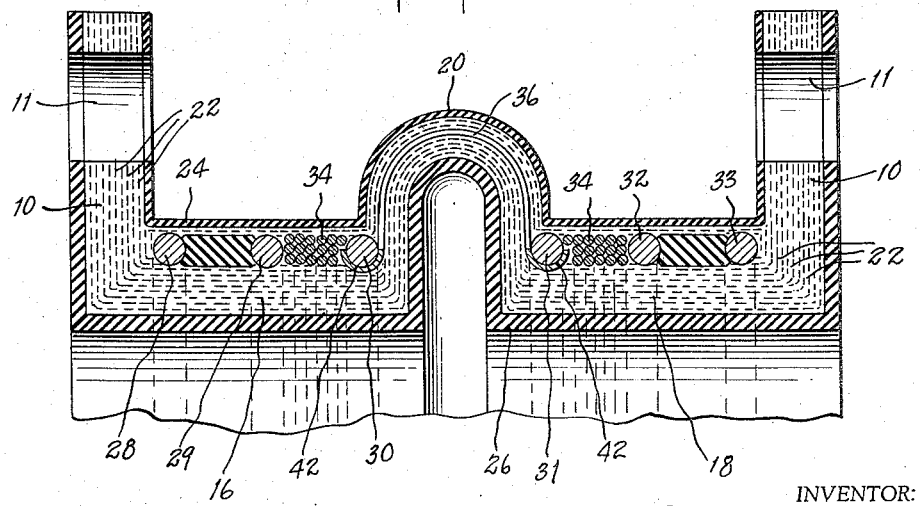
Fig. 2 is an enlarged longitudinal-radial sectional view of said joint.

The reinforcing element 36 is preferably formed from a flat blank of suitable, somewhat resilient, sheet-metal strip of which a fragmentary portion is shown in Fig. 4, said strip being formed with a plurality of uniformly spaced, transversely extending cutouts 38 which terminate short of side marginal edges of the strip to leave or form side marginal portions 40 extending along opposite sides of the strip. The flat blank may, by suitable apparatus, be rolled into the annular and U-shaped form fragmentarily shown in Fig. 3; and in thus rolling the reinforcing element to shape, the opposite side marginal portions 40 are given reverse bends to shape them as semi-circular or trough-like annular hooks or lips 42, as best seen in Figs. 2 and 3.

It will be understood that the cutouts 38 permit such forming of the originally flat strip into an annulus and that while the annulus thus formed may flex in the sense that the troughs or lips 42 at opposite sides of the element 36 may move toward or away from each other, the arch portion of the reinforcing element 36 or, i.e., the strips 39, present between the cutouts 38, may not become elongated. The flat strip from which the element 36 is made should be somewhat longer than the circumferential length of the steel rings 30 and 31 so that opposite ends of said strip may overlap as at 43 and be welded together at the overlap to give circumferential continuity to the reinforcing element 36. When such overlapping and welding have been completed, the finished reinforcing element should be of such circumferential dimension that the lip 42 may seat closely inside the rings 30 and 31, as best shown in Fig. 2.

As a practical matter, the rings 30, 31 may be of suitable lengths of heavy steel wire or bendable steel rod material, bent into circular shape and abutted and welded into continuous rings. In preparing an assembly of the element 36 and the rings 30, 31, the welding of either the rings or of the element 36 is deferred until the parts of said assembly are properly associated with each other. The assembly of the rings 30, 31 and reinforcing element 36 is, of course, properly associated with the other constituents of the joint upon or in relation to the mould members on which the joint is shaped and cured.

As the cross members 39 are of sufficient strength to withstand any pressure which might be present within the expansion joint without becoming elongated and as those cross members are quite close together, it follows that the expansion joint is well safeguarded against bursting from internal pressure. The lips 42, because of their sharp angle of curvature about the steel rings 30 and 31, are very rigid and will not become deformed and pull away from the rings 30 and 31 under any pressure to which the expansion joint might be subjected in use. As the rings 30 and 31 are continuous and strong enough to resist expansion from any pressure inside of the joint, they make it impossible for the reinforcing element 36, hooked to said rings, to be shifted radially outwardly by pressure within the joint.

It should also be evident that the annular reinforcing element 36 will not inhibit flexing of the arch 20 endwisely of the joint sufficiently to offer any material opposition to longitudinal expansion or contraction of the expansion joint as a whole; also, that the mentioned reinforcing element constitutes a very effective means for preventing bursting of the expansion joint at the arch 20 even though the joint may be subjected to very high internal pressures.

Figs. 5 and 6 illustrate another form of annular reinforcing element that may be employed within this invention, the reinforcing element 44 shown in those figures being of the same general or over-all shape as reinforcing element 36 but having transverse slits 46 which, instead of being closed slits, are open slits which extend oppositely from a central, longitudinal portion 48 of the blank from which the reinforcing element is made (shown fragmentarily in Fig. 6) and extend completely to and open at the opposite side edges of said blank.

The length of the sheet-metal strip from which the reinforcing element 44 is made preferably should be somewhat longer than the circumferential dimension of the arch 20 at the center of said arch and at the depth therewithin at which the reinforcing element is to be located. As with element 36, the ends of the blank of which the element 44 is made, preferably overlap and are welded together to constitute the reinforcing element 44 as a continuous annulus.

Also, in the embodiment of Figs. 5 and 6, the ends of fingers 49, formed by the provision of the transverse slits 46, are bent outwardly and reversely to give them a semi-circular or U-shape; and such finger ends constitute an assembly of troughs or lips 50 which will seat against the inner surfaces of the steel rings 30 and 31 in much the same manner as the troughs 42 of Figs. 2 and 3 engage within the mentioned steel rings in the first described embodiment.

As the lips 50 are collectively strong enough to avoid deformation and to avoid being forced away from the rings 30 and 31 by any pressure which would be present within the joint, it follows that the reinforcing element 44 functions, for reinforcing purposes, much the same as reinforcing element 36. It may be observed that as fingers 49 are each flexible independently, the welding of the element 44 and of the rings 30 and 31, as continuous annuli, may be completed before said reinforcing element is assembled into hooked relationship to said rings.

Figs. 7, 8, and 9 illustrate still another form of reinforcing element which may be provided in the arch 20. As best seen in Fig. 8, the reinforcing element 52 shown therein is initially in the form of a woven or braided sleeve of wire fabric or mesh, the strands of which, preferably, extend on-the-bias. The two steel rings 30 and 31 are welded to give them their continuity as annuli after being inserted into the wire mesh sleeve. The sleeve is of sufficient length that after the rings 30 and 31 are disposed therein and welded, the ends of the sleeve will overlap and may be spot-welded together to form a continuous annulus.

Before the rings 30, 31 and the wire mesh reinforcing element 52 are assembled on the mandrel mould with other components of the joint, the wire mesh adjacent to the rings 30, 31 is preferably pressed together so that the inner and outer portions of the wire mesh sleeve will lie in intimate relationship, as best shown in Figs. 7 and 9. It may be considered that reinforcing element 52 possesses an advantage because of its increased flexibility as compared to elements 36 and 44. Additionally, the wire mesh element 52 would provide a more complete or over-all reinforcement than would the elements 36 or 44 having the cutouts therein. On the other hand, the difficulty of forming and assembling the reinforcing element 52 with the rings 30, 31 may render the element 52 less desirable under some manufacturing conditions than either of the elements 36 or 44.

Fig. 10 illustrates still another reinforcing arrangement in which the broad principles of this invention are utilized not only to reinforce the arch 20 but also to reinforce the remainder of the joint. In that figure is shown a wire mesh reinforcing element 54 which differs from the element 52 only in being enough wider than the latter to enable it to extend within and partly around continuous steel rings 30a and 31a and to accommodate therewithin continuous steel rings 29a and 32a much as rings 30 and 31 are disposed within wire mesh element 52.

In general, reinforcing element 54 functions much like element 52 to reinforce the arch 20. The remainder of the joint may be provided with supplemental reinforcing means bearing a rather close similarity to the element 54. The supplemental reinforcing means would ordinarily be similar toward opposite ends of the joint; hence, they will be described chiefly with reference to one end of the joint.

The supplemental reinforcing means, as illustrated, comprises a supplemental reinforcing element 56 consisting of a preferably on-the-bias, braided or woven wire mesh strip, folded longitudinally in half and then, after being rolled or turned into substantially circular form, associated with continuous ring 31a with the latter within the two halves and adjacent the fold of the element 56, the ends of the strip then preferably being welded together to form a continuous annulus. The ring 31a and element 56 are associated with the other constituents of the joint as illustrated in Fig. 10. With the two longitudinal halves of the strip disposed in intimate face-to-face relationship in the formed annulus, said two halves extend outside and partly around ring 32a and a marginal portion of element 54, thence between rings 32a and 33a and through the latter and thence into and to the outer edge of flange 10 of the joint. The internal areas of the joint's wall adjacent to the rings 28a—33a and not occupied by the fabric plies 22 or by portions of the elements 54 or 56 are, of course, occupied by rubber. It may be seen that, when arch 20 of the joint is under internal pressure as in use, the rings 29a and 32a have a tendency to be pulled inwardly or toward each other by the element 54, but as all the steel rings are continuous and as rings 30a and 31a are securely held within the elements 56 which, in turn, are firmly embedded within the flanges 10, it follows that rings 30a and 31a prevent such inward shifting of rings 29a and 32a. With reference to any tendency of pressure within arch 20 to force rings 30a and 31a outwardly (such a tendency being noted in said Patent No. 2,692,782), rings 29a and 32a very effectively oppose such tendency by reason of the fact that they are within element 54 which is firmly embedded in the arch 20. Hence, in the just-described arrangement, wire windings, such as are shown at 34 in Fig. 2, may be omitted.

It is worthy of note that, if rings 29a, 30a, 31a and 32a are disposed in substantially perfect coaxial alignment (as would normally be the case) in the moulded joint, their disclosed association with reinforcing elements 54 and 56 serves to retain them in such alignment, thereby enabling them to cooperate to resist being shifted longitudinally of the joint as a result of pressure within the arch 20. Such cooperation would be impaired if said rings were not prevented by elements 54 and 56 from becoming malaligned and from canting relatively to each other. It will be understood, by those familiar with this art, that any such shifting of the steel rings would cause rupture of the wall of the joint and quickly cause failure of the latter. The arrangement of Fig. 10 not only affords substantial reinforcement, but also very effectively opposes such shifting of the steel rings.

Although it has hereinbefore been indicated that the overlapping portions of the reinforcing elements 36, 44, 52, 54 and 56 should be welded, it should be understood that such welding is not essential.

It should be apparent that the presently disclosed inventive concept may be utilized in various other ways without, however, departing from the invention as set forth in the following claims.

I claim:
1. A reinforced expansion joint comprising an annular arch which may expand and contract axially and tends to become distended radially in the presence of fluid pressure therewithin, continuous reinforcing rings of material of relatively high tensile strength embedded coaxially within wall portions of said joint adjacent opposite, side base portions of said arch, and an axially flexible, annular, reinforcing element comprising a circumferential series of interconnected cross members of sheet metal embedded within said arch and substantially coextensive with the latter; said reinforcing element having opposite, side base portions anchored to said rings, substantially uniformly about the latter.

2. A reinforced expansion joint according to claim 1, said reinforcing element having circumferentially extending lips at opposite base portions of said element, said lips being curved axially of the reinforcing element and extending within and partly about said rings, whereby to restrict radially outward expansion of said reinforcing element and thereby oppose radial distention of the arch.

3. A reinforced expansion joint according to claim 2, the axial curvature of said lips being approximately the same as the curvature of adjacent surfaces of said rings around a cross-section thereof and said lips being in intimate association with said rings.

4. A reinforced expansion joint according to claim 2, said lips being continuous circumferentially.

5. A reinforced expansion joint according to claim 2, said reinforcing element having a susbtantially nonextensible, central, peripheral portion interconnecting said cross members, the latter having end areas collectively constituting said lips.

6. A reinforced expansion joint according to claim 5, said central, peripheral portion being continuous circumferentially.

7. A reinforced expansion joint comprising an annular, axially extendible arch, cylindrical portions integral with opposite, side base portions of said arch and connectable to opposed sections of piping in which the joint is to be used, an endless reinforcing ring of material of relatively high tensile strength in each of said cylindrical portions, and an axially flexible, annular, reinforcing element embedded within said arch and having circular, opposite, side base portions connected to said rings; said reinforcing element comprising a circumferential series of interconnected cross members of sheet metal.

References Cited in the file of this patent
UNITED STATES PATENTS

| | | |
|---|---|---|
| 589,434 | Hooper | Sept. 7, 1897 |
| 1,263,953 | Smyth | Apr. 23, 1918 |
| 1,911,570 | Holstein | May 30, 1933 |
| 2,268,249 | Goodrich | Dec. 30, 1941 |
| 2,365,063 | Downey | Dec. 12, 1944 |
| 2,387,486 | Zellos | Oct. 23, 1945 |
| 2,544,119 | Wolfe | Mar. 6, 1951 |
| 2,592,501 | Williams | Apr. 8, 1952 |
| 2,692,782 | Jones | Oct. 26, 1954 |